March 6, 1973     G. M. WOODRUFF     3,719,736
METHOD OF PRODUCING PERFORATED PLASTIC FILM
Original Filed Jan. 30, 1969
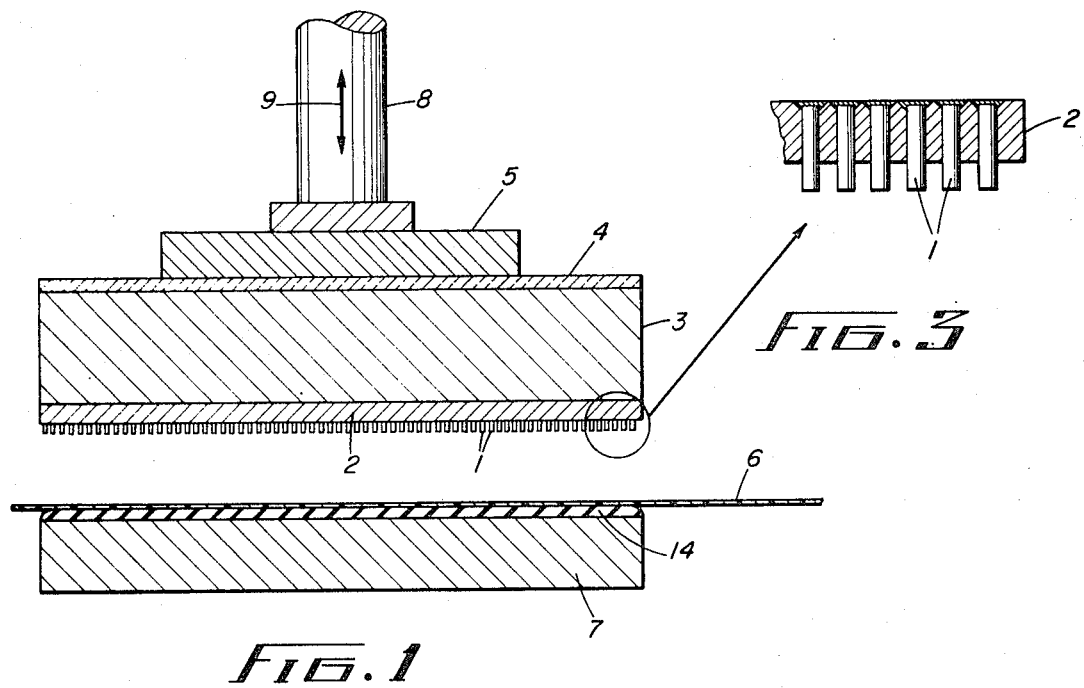
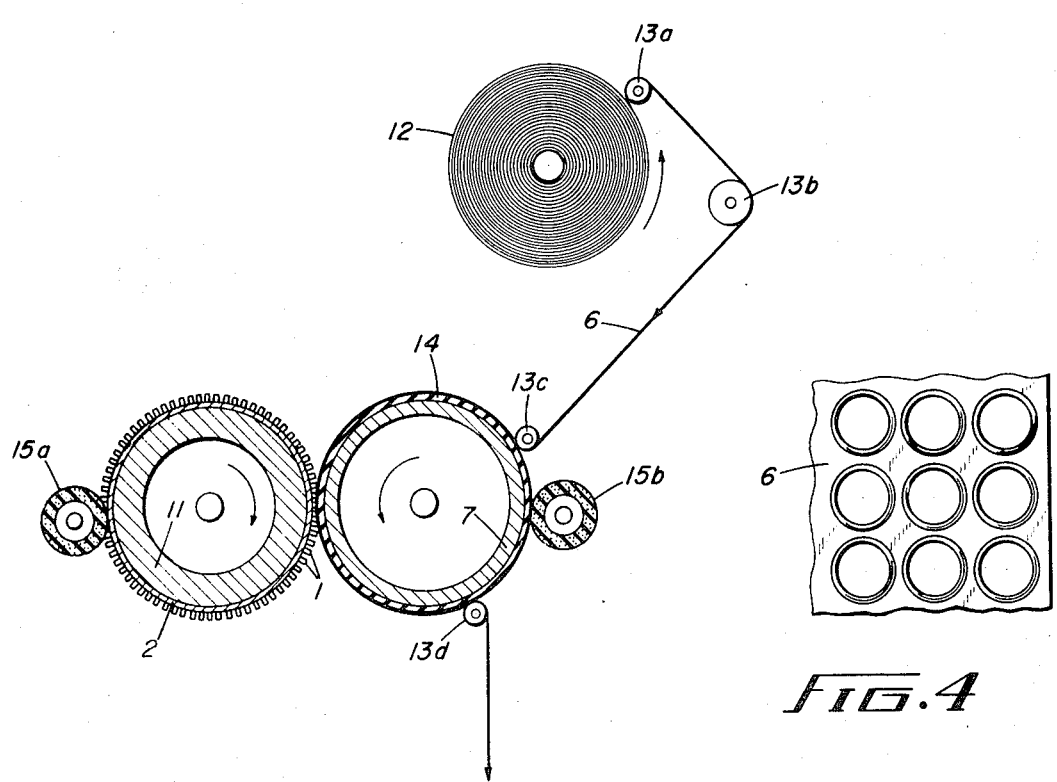
INVENTOR.
GEORGE M. WOODRUFF
BY
Gerald E. Jacobs
ATTORNEY

United States Patent Office 3,719,736
Patented Mar. 6, 1973

3,719,736
METHOD OF PRODUCING PERFORATED PLASTIC FILM
George M. Woodruff, Farmington, Conn., assignor to General Foods Corporation, White Plains, N.Y.
Continuation of abandoned application Ser. No. 795,271, Jan. 30, 1969. This application Oct. 8, 1970, Ser. No. 79,330
Int. Cl. B28b 1/48
U.S. Cl. 264—156                   3 Claims

ABSTRACT OF THE DISCLOSURE

A new method of perforating plastic films has been discovered which results in a perforated film having about 2000 holes per square inch which can be effectively utilized as a filtration medium. The perforated film is prepared by piercing the plastic material with heated pins and maintaining the temperature of the pins above the melting point of the plastic for a sufficient period of time to cause the flap material to form a reinforced ring around the holes. The result is a perforated film which retains most of its original strength and is free of ragged edges or flaps.

---

This application is a continuation of application Ser. No. 795,271, filed on Jan. 30, 1969, not abandoned.

BACKGROUND OF THE INVENTION

This invention pertains to a method of perforating plastic films to produce a web material suitable for use as a filtration medium. More particularly, it pertains to a method of making a web material suitable for use in the manufacture of infusion bags suitable for holding ground coffee or tea.

In U.S. Pat. No. 3,334,803, a method is described wherein a plastic film is pierced with sharp needles to form holes on the order of 0.0005 to 0.001 inch which are said to be free of scrap or chad due to the small size of the hole and the sharpness of needles used in piercing the plastic. The perforations are produced by winding the film on a drum and piercing the film with the needles which are contained on a roll and which is in rolling contact with the drum.

In U.S. Pat. No. 2,817,596, paper is perforated in a similar manner as above. However, the piercing roll contains teeth and the holes are formed by passing the sheet material between a backing roll and the roll with teeth. This technique tends to produce rectangular holes with dimensions varying from about 0.12 x 0.30 inch to 0.08 to 0.26 inch. The longer dimension is in direction of the fibers and this is reported as advantageous because the strength of the material is increased and the flap portions which may result are easily removed by subsequent operations, e.g. brushes.

The foregoing techniques, while producing perforated films which can be used for infusion bags, are unsatisfactory in several respects. The needle piercing technique produces holes which are so small, that in spite of the large number of holes per sq. in. (1000 to 3000), infusion may be inhibited. Also, it is questionable whether the perforated film is truly free of chad or scrap and the number and spacing of holes is random. The rectangular holes produced by piercing the film with teeth, requires an additional operation to produce a chad free product. Also, the perforated films have significantly less tensile strength than the same film prior to perforation.

SUMMARY

It has now been discovered that a perforated plastic film suitable for use in making infusion bags can be made by piercing a plastic film with heated pins to yield a filtration media with reinforced holes such that the tensile strength of the plastic film is not significantly reduced by the perforations. The holes are reinforced by maintaining the temperature of the needles above the melting point of the plastic, such that when the plastic is fluid, the pin pressure exerted develops a hydraulic force which causes the molten plastic to squeeze out from under the pins and form into a circular bead or rib surrounding the open holes. The holes made by the method of this invention are spaced in a predetermined pattern which corresponds to the spacing of the needles. The needles used are not sharp, but rather are blunted to a flat, circular surface having a diameter equal to the desired hole size.

The perforated plastic films produced by this invention are free of chad or scrap. The holes are uniformly spaced in a desired pattern. Up to about 2000 holes per square inch can be achieved and the hole size can be from about 0.01 to 0.025 inch in diameter. All of the holes are reinforced and the tensile strength of the perforated film is approximately the same as the unperforated film.

DESCRIPTION OF THE PREFERRED EMBODIMENT

A perforated plastic film with precisely spaced and sized holes is produced by passing a web of plastic between a backing cushion and an anchor place which holds the spaced pins. The pins are heated to a temperature above the melting point of the plastic and are pressed firmly against the web material and the backing, causing the material beneath the pins to become molten or fluid. The molten material is squeezed out from beneath the pins and forms circular beads or ribs around the pins. This bead restores the tensile strength of the perforated web to approximately the same strength as that of the unperforated web. The molten plastic is allowed a brief period for air cooling during which time the plastic recongeals. It can then be lifted off or stripped from the backing cushion and is ready for use as a filter medium. The perforated material can be cut into pieces of any desired size and shape and used as a filter pad or shaped into infusion bags for items such as ground coffee or tea.

The needles used in this invention are blunted such that the tip is a flat, circular surface. The diameter of the flat surface can be precisely controlled and will be equivalent to the size of the perforation desired. In this manner, the size of the perforations are accurately controlled. The pins are held by an anchor plate, typically the pins are brazed onto the plate. The spacing of the pins is thus readily predetermined and can conform to any desired pattern of perforations.

The perforated plastic film of this invention is particularly suitable for use as an infusion bag for ground coffee or tea. The perforations must be of such a size that the particles of tea or coffee will not fall out of the openings. Typically, the holes may be from 0.01 to 0.025 inch in diameter, the smaller holes being preferred for use in a tea bag. It has been found that up to 1,500 pins per square inch can be brazed into place, to produce holes within the desired size range.

It is anticipated that a low cost material will be used, such as a low density polyethylene web stock from 0.001 to 0.002 inch in thickness. In using such a material, the pins must be maintained at a temperature of about 375° F. in order to cause the plastic to become molten and flow around the pins. The pins can be heated either electrically or with a heating fluid. When using a heating fluid one would install the anchor plate holding the pins at the base of a heating block. The heating medium would flow through the block and transfer heat to the pins.

When perforating the plastic film, the pins should be pressed firmly against the plastic and the backing cushion with sufficient force to squeeze the molten plastic out from beneath the pins. When using a polyethylene web stock as described in the preceding paragraph, a hydraulic force ranging from about 400 to 600 pounds per square inch of pin area is desired, depending upon the diameter of the holes produced.

The necessary force can be exerted by mounting the pins, the anchor plate and heating block on a press and simply pressing the pins against the plastic and the backing. Such an arrangement is shown in FIG. 1 where the heated pins 1 are shown attached to an anchor plate 2 which is in turn attached to a heater block 3. The heater block is insulated 4 and the entire assembly is held on a press by a mounting plate 5. The plastic film 6 passes over the backing plate 7 shown below the press. The shaft of the press is depicted by 8 and the path of travel is indicated by the arrow on the shaft 9.

Alternatively, the anchor plate can be in the form of a drum and the backing plate can be a drum, the plastic film being fed between the two drums and the pressure applied at the nib between the drums. Such an arrangement is shown in FIG. 2 where the heated pins 1 are brazed to an anchor plate in the form of a drum 2 and the heating element 11 is located within the drum. The backing plate 7 is also in the form of a drum and the plastic film 6 is fed through the drums from a web supply roll 12. The rollers 13a, b, c and d are used to guide the plastic sheet which continues on after perforation to a cutter (not shown).

In order to prevent sticking, the backing plate should be covered with a non-sticking cushion such as a silicone rubber cushion shown in FIGS. 1 and 2 as 14. The Shore durometer of the cushion should be between 75° and 95°, depending on the diameter of the pin tip being used. In addition, the pins and cushion should be coated with a mold release agent. In FIG. 2 this is readily accomplished continuously by roller applicators 15a and b. With a press arrangement such as that shown in FIG. 1 the mold release agent can be sprayed on while the press is in a raised position.

FIG. 3 is an enlarged view of the pins 1 brazed onto the backing plate 2. The pins can be cylindrical as shown in the figure, or may have tapered ends. However, whether tapered or cylindrical, the ends of the pins will be a flat circular surface of a desired diameter.

FIG. 4 is illustrative showing a section of the plastic film 6 which has been perforated by the process of this invention.

The invention of this experiment will be further understood by reference to the following example.

EXAMPLE

A press apparatus such as that depicted in FIG. 1 was used to perforate polyethylene web stock of 1 mil thickness.

A circular anchor plate was used and the pins were brazed to the plate to give a uniformly spaced pattern of holes. The diameter of the circular pin tips was 0.016 inch and there were 1,200 pins per square inch.

The backing plate was covered with a silicone rubber cushion having a Shore durometer of 85°. The polyethylene sheet was placed on top of the cushion after it had been sprayed with a silicone mold release agent.

The heating block above the pins was steam heated and the pin temperature was raised to 400° F. The pins were then sprayed with the silicone mold release agent and pressed firmly against the plastic sheet and cushion. The hydraulic force applied was equivalent to 500 pounds per square inch of pin area and the molten plastic flowed out from beneath the pins and formed as beads around the pins. Heating was discontinued and the plastic permitted to cool and congeal.

The press was raised and the resultant perforated disc was found to be free of chad or scrap. The holes were uniform in size and were reinforced by the plastic which had flowed around the pins.

The perforated disc was suitable for use as a filter or as a material for forming infusion bags.

The foregoing example was for illustrative purposes only and the invention is intended to be limited only by the appended claims.

What is claimed is:

1. A method of manufacturing a perforated plastic film suitable for use as a filtration medium comprising placing a film of plastic on a smooth-surfaced silicone rubber covered backing plate, said silicone rubber covering have a Shore durometer value ranging from 75° to 95° and coated with a mold release agent; pressing heated pins firmly against said plastic film and backing plate; said pins having flat, circular heads of a predetermined diameter and said pins being attached to an anchor plate in a predetermined pattern at from about 500 to about 2,000 pins per square inch, the temperature of said pins being above the melting point of said plastic film, said pin being coated with a mold release agent prior to their being pressed against the plastic film; the pressure exerted by the pins being sufficient to cause the plastic beneath the pins to flow out and form beads around said pins; cooling said pins and plastic film to recongeal the plastic which beaded around the pins, thus causing the beaded plastic to form a reinforcing ring around the perforations caused by the pins; removing the pins from said plastic film and removing the thus perforated plastic film from the backing plate.

2. The method of claim 1 wherein the diameter of the circular pin heads is from 0.01 to 0.025 inch and the thickness of the plastic film is from 0.001 to 0.003 inch.

3. The method of claim 1 wherein the plastic film is a polyethylene film, the pin temperature is at least 375° F. and the pressure exerted by the pins is from about 400 to 600 pounds per square inch of pin head area.

References Cited

UNITED STATES PATENTS

| | | | |
|---|---|---|---|
| 2,115,122 | 4/1938 | Prudden | 264—156 |
| 2,748,863 | 6/1956 | Benton | 264—156 |
| 3,012,918 | 12/1961 | Schaar | 161—109 |
| 3,085,024 | 4/1963 | Blackford | 264—154 |
| 3,092,439 | 6/1963 | Harrison | 264—154 |
| 2,748,803 | 6/1956 | Benton | 83—171 |
| 3,227,854 | 1/1966 | Ramsey et al. | 156—513 X |
| 3,284,248 | 11/1966 | Rumberger | 264—213 X |
| 3,414,937 | 12/1968 | Malmgren | 83—171 X |
| 3,503,097 | 3/1970 | Krupp | 264—156 X |
| 3,517,410 | 6/1970 | Rapisarda | 264—156 X |
| 3,525,279 | 8/1970 | Christian | 264—155 |
| 3,562,066 | 2/1971 | Denny | 156—513 |
| 2,924,863 | 2/1960 | Chavannes | 264—156 X |
| 3,393,861 | 7/1968 | Clayton et al | 229—53 |
| 3,496,260 | 2/1970 | Guenther et al. | 264—156 |

FOREIGN PATENTS

| | | | |
|---|---|---|---|
| 707,253 | 4/1965 | Canada | 264—156 |
| 876,086 | 8/1961 | Great Britain | 264—156 |
| 707,253 | 4/1965 | Canada | 264—156 |

ROBERT F. BURNETT, Primary Examiner

J. C. GIL, Assistant Examiner

U.S. Cl. X.R.

83—16; 156—252; 161—109, 110, 112; 229—53